United States Patent
Vanderveken et al.

(10) Patent No.: US 8,507,576 B2
(45) Date of Patent: Aug. 13, 2013

(54) COMPOSITION OF AT LEAST ONE VINYLIDENE CHLORIDE COPOLYMER

(75) Inventors: Yves Vanderveken, Heverlee (BE); Pascal Dewael, Buvrinnes (BE); Giovanni Fontana, Paderno Dugnano (IT)

(73) Assignee: Solvay S.A., Brussels (BE)

( * ) Notice: Subject to any disclaimer, the term of this patent is extended or adjusted under 35 U.S.C. 154(b) by 357 days.

(21) Appl. No.: 12/742,998

(22) PCT Filed: Nov. 21, 2008

(86) PCT No.: PCT/EP2008/065982
§ 371 (c)(1),
(2), (4) Date: May 14, 2010

(87) PCT Pub. No.: WO2009/065925
PCT Pub. Date: May 28, 2009

(65) Prior Publication Data
US 2011/0060071 A1    Mar. 10, 2011

(30) Foreign Application Priority Data

Nov. 22, 2007 (FR) .................. 07 59226

(51) Int. Cl.
*B32B 27/30* (2006.01)
*C08F 214/08* (2006.01)
*C08L 27/08* (2006.01)

(52) U.S. Cl.
USPC .... 523/100; 428/36.6; 428/36.91; 525/331.5; 524/502; 524/568; 524/569

(58) Field of Classification Search
USPC .......... 523/100; 428/36.6, 36.91; 525/331.5; 524/502, 568, 569
See application file for complete search history.

(56) References Cited

U.S. PATENT DOCUMENTS

| 3,340,216 A | 9/1967 | Mack |
| 5,115,029 A * | 5/1992 | Kirkpatrick et al. .......... 525/239 |
| 5,830,947 A * | 11/1998 | Blong et al. .................. 525/187 |
| 6,127,486 A | 10/2000 | Buerger et al. |
| 6,599,962 B2 | 7/2003 | McCleskey et al. |
| 2005/0129885 A1* | 6/2005 | Mize ........................ 428/35.2 |
| 2007/0142527 A1* | 6/2007 | Rosa et al. .................. 524/425 |
| 2007/0218207 A1 | 9/2007 | Fringant et al. |
| 2009/0054583 A1 | 2/2009 | Fringant et al. |
| 2009/0123678 A1* | 5/2009 | Beyer et al. .................. 428/34.8 |
| 2009/0202760 A1 | 8/2009 | Fringant et al. |

FOREIGN PATENT DOCUMENTS

| GB | 1045059 A | 10/1966 |
| GB | 1171245 A | 11/1969 |
| GB | 1253971 A | 11/1971 |
| JP | 63105062 A | 5/1988 |
| JP | 03234736 A | 10/1991 |
| JP | 20040224896 A | 8/2004 |
| WO | WO 8903411 A1 | 4/1989 |
| WO | WO 9103518 A1 | 3/1991 |
| WO | WO 00/32679 A1 | 6/2000 |
| WO | WO 03039228 A2 | 5/2003 |
| WO | WO 2005/028557 A1 | 3/2005 |
| WO | WO 2006044113 A1 * | 4/2006 |
| WO | WO 2007039626 A1 | 4/2007 |
| WO | WO 2008028915 A1 | 3/2008 |
| WO | WO2008028918 A1 | 3/2008 |

* cited by examiner

*Primary Examiner* — Michael Pepitone
(74) *Attorney, Agent, or Firm* — Oblon, Spivak, McClelland, Maier & Neustadt, L.L.P.

(57) ABSTRACT

Vinylidene chloride copolymer composition characterized in that it comprises: (A) at least one vinylidene chloride copolymer which is a copolymer composed of vinylidene chloride in an amount of at least 50 wt % and of at least one comonomer at least one of which is chosen from (meth)acrylic monomers corresponding to the general formula: $CH_2=CR_1R_2$, in which $R_1$ is chosen from hydrogen and the methyl radical and $R_2$ is the —CO—$R_3$ radical in which $R_3$ is the —O—$R_4$ radical with $R_4$ chosen from the linear or branched alkyl radicals containing from 1 to 18 carbon atoms optionally bearing one or more —OH radicals, the epoxyalkyl radicals containing from 2 to 10 carbon atoms and the alkoxyalkyl radicals containing a total of 2 to 10 carbon atoms; (B) from 0.5 to 4 parts by weight, per 100 parts by weight of (A), of epoxidized soybean oil; (C) from 0.01 to 2 parts by weight, per 100 parts by weight of (A), of at least one fluoropolymer chosen from the amorphous fluoropolymers for which the glass transition temperature is less than or equal to 200° C. and the semi-crystalline fluoropolymers for which the melting point is less than or equal to 200° C.; and (D) at most 1 part by weight, per 100 parts by weight of (A), of at least one acid scavenger. Process for preparing said composition. Multi-layer film comprising said composition and packaging or bag formed from this film.

20 Claims, No Drawings

COMPOSITION OF AT LEAST ONE VINYLIDENE CHLORIDE COPOLYMER

CROSS-REFERENCE TO RELATED APPLICATIONS

This application is a U.S. national stage application under 35 U.S.C. §371 of International Application No. PCT/EP2008/065982 filed Nov. 21, 2008, which claims priority to French Patent Application No. 0759226 filed Nov. 22, 2007, these applications being incorporated herein by reference in their entirety for all purposes.

The present invention relates to a composition of at least one vinylidene chloride copolymer, a process for preparing such a composition, a multilayer film comprising such a composition and the packaging or bag formed from this film.

Vinylidene chloride copolymers are known for their remarkable properties as regards permeability to gases and odours. One disadvantage of vinylidene chloride copolymers is nevertheless that they have a tendency to decompose under the action of heat. It is therefore sometimes necessary to improve their thermal stability to avoid this drawback during their use. It may also be necessary to improve their lubrication in order to reduce the formation of layers of degraded polymer on any metal part of the implementation equipment with which the polymer is in contact, in particular the formation of deposits on the die.

Various solutions have been proposed in the past for improving the properties of vinylidene chloride copolymers as a function of the targeted applications.

Thus, Patent Application GB 1171245 describes the addition to a copolymer of vinylidene chloride and 7 to 12% by weight, relative to the weight of the blend of monomers, of a comonomer chosen from alkyl acrylates containing up to 4 carbon atoms and acrylonitrile, or to a copolymer of vinylidene chloride and 15 to 25% by weight, relative to the weight of the blend of monomers, of vinyl chloride, of at most 5% by weight, relative to the weight of the vinylidene chloride copolymer, of polytetrafluoroethylene (PTFE) in the form of an aqueous dispersion, added to the aqueous polymerization medium in which the vinylidene chloride copolymer is synthesised, before the latter copolymer is separated from this aqueous medium. Owing to the addition of the PTFE, a better melt behaviour and a high crystallization rate characterize the compositions of vinylidene chloride copolymers obtained so that, after extrusion or moulding, a certain rigidity rapidly develops and makes it possible to envisage the production of articles that require such a rigidity such as tubing, bottles and also covering of substrates such as films and paper by extrusion-coating.

Patent Application JP-A-3-234736 furthermore describes, itself, a method for moulding a resin of a vinylidene chloride copolymer according to which the moulding of this resin is carried out after the barrel of the extruder through which the molten resin is conveyed is brought into contact with a fluorine-containing polymer. This method is presented as making it possible to considerably reduce, or even to completely avoid, the additives that are customarily used to improve the thermal stability, usually plasticizers, but that are furthermore responsible for degradation of the barrier properties. The examples thus illustrate the beneficial effect of this particular method on the thermal stability and the adhesion to the equipment during the use of compositions of a vinylidene chloride/vinyl chloride copolymer possibly optionally containing a fluoropolymer in addition to epoxidized soybean oil and a certain amount of a plasticizer, without however stating what the barrier properties are of the films which could be obtained from these compositions based on a copolymer of vinylidene chloride and vinyl chloride.

Application JP-A-2004/224896 itself describes vinylidene chloride copolymer compositions that are characterized by a weight-average molecular weight, measured by gel permeation chromatography, between 80,000 and 150,000, comprising from 0.01 to 0.5 parts by weight of a fluoropolymer and from 0.01 to 10 parts by weight of a crystallization accelerator (nucleating agent), per 100 parts by weight of the composition. The advantages observed are a reduction in the amount of deposits on the die, a high crystallization rate and an improvement in the high-frequency sealing of films obtained from these compositions, which are single-layer films used for packaging sausages. The examples illustrate these beneficial effects in the case of compositions of a vinylidene chloride/vinyl chloride copolymer comprising a blend of two fluoropolymers including PTFE and magnesium silicate, without however stating what the barrier properties are of the films obtained.

Vinylidene chloride copolymer compositions may find other applications in the field of food packaging, in particular in the production of multilayer-type films. In this context, these compositions must be characterized by an excellent thermal stability. They must moreover be able to be used without layers of degraded polymer being formed on the metal parts of the equipment with which the polymer is in contact, which would affect the quality of the films obtained (transparency, uniformity of the thickness). For this type of application, the films obtained must moreover be characterized by excellent barrier properties to gases and odours, significantly greater than those required for applications that make use of single-layer films.

In so far as none of the documents mentioned above describes the obtaining of compositions that are characterized by all these properties at the same time, there therefore remains a need to obtain such compositions.

One subject of the present invention is thus a vinylidene chloride copolymer composition comprising:

(A) at least one vinylidene chloride copolymer which is a copolymer composed of vinylidene chloride in an amount of at least 50 wt % and of at least one comonomer at least one of which is chosen from (meth)acrylic monomers corresponding to the general formula:

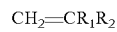

in which $R_1$ is chosen from hydrogen and the methyl radical and $R_2$ is the —CO—$R_3$ radical in which $R_3$ is the —O—$R_4$ radical with $R_4$ chosen from the linear or branched alkyl radicals containing from 1 to 18 carbon atoms optionally bearing one or more —OH radicals, the epoxyalkyl radicals containing from 2 to 10 carbon atoms and the alkoxyalkyl radicals containing a total of 2 to 10 carbon atoms;

(B) from 0.5 to 4 parts by weight, per 100 parts by weight of (A), of epoxidized soybean oil;

(C) from 0.01 to 2 parts by weight, per 100 parts by weight of (A), of at least one fluoropolymer chosen from the amorphous fluoropolymers for which the glass transition temperature is less than or equal to 200° C. and the semi-crystalline fluoropolymers for which the melting point is less than or equal to 200° C.; and (D) at most 1 part by weight, per 100 parts by weight of (A), of at least one acid scavenger.

The composition according to the invention comprises (A) at least one vinylidene chloride copolymer which is a copolymer composed of vinylidene chloride in an amount of at least 50 wt % and of at least one comonomer at least one of which is chosen from (meth)acrylic monomers corresponding to the general formula:

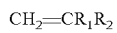

in which $R_1$ is chosen from hydrogen and the methyl radical and $R_2$ is the —CO—$R_3$ radical in which $R_3$ is the —O—$R_4$ radical with $R_4$ chosen from the linear or branched alkyl radicals containing from 1 to 18 carbon atoms optionally bearing one or more —OH radicals, the epoxyalkyl radicals containing from 2 to 10 carbon atoms and the alkoxyalkyl radicals containing a total of 2 to 10 carbon atoms.

The expression "at least one vinylidene chloride copolymer" is understood to mean that the composition may comprise one or more of them. Preferably, it comprises only one of them.

In the remainder of the text, the expression "vinylidene chloride copolymer" used in the singular or plural should be understood as denoting one or more vinylidene chloride copolymers, except where denoted otherwise.

The expression "copolymer composed of vinylidene chloride in an amount of at least 50 wt % and of at least one comonomer" is understood to mean the copolymers of vinylidene chloride, which is the main monomer, with at least one comonomer that is copolymerizable with the latter.

The expression "at least one comonomer at least one of which is chosen from (meth)acrylic monomers corresponding to the general formula $CH_2$=$CR_1R_2$ defined above is understood to mean that at least one of the comonomers corresponds to this formula.

Among the monomers corresponding to this formula, mention may be made of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate and glycidyl acrylate.

The copolymer of the composition according to the invention is preferably a copolymer composed of vinylidene chloride in an amount of at least 50 wt %, of at least one comonomer chosen from methyl acrylate, methyl methacrylate, ethyl acrylate, ethyl methacrylate, n-butyl acrylate, n-butyl methacrylate, 2-ethylhexyl acrylate and 2-ethylhexyl methacrylate, and of at least one other comonomer chosen from the comonomers corresponding to the formula $CH_2$=$CR_1R_2$ defined above other than the aforementioned alkyl (meth)acrylates, vinyl acetate, maleic anhydride, itaconic acid, acrylonitrile, methacrylonitrile, acrylic acid, methacrylic acid, copolymerizable surfactants such as 2-acrylamido-2-methylpropanesulphonic acid (AMPS) or one of its salts, for example the sodium salt and 2-sulphoethylmethacrylate acid (2-SEM) or one of its salts, for example the sodium salt, and also the phosphate ester of methacrylate-terminated polypropylene glycol (such as the product Sipomer PAM-200 from Rhodia) or one of its salts, for example the sodium salt.

The copolymer of the composition according to the invention is particularly preferably a copolymer composed of vinylidene chloride in an amount of at least 50 wt %, of methyl acrylate and of at least one comonomer chosen from methyl methacrylate, ethyl acrylate, ethyl methacrylate, n-butyl acrylate, n-butyl methacrylate, 2-ethylhexyl acrylate and 2-ethylhexyl methacrylate, the comonomers corresponding to the formula $CH_2$=$CR_1R_2$ defined above other than the aforementioned alkyl (meth)acrylates, vinyl acetate, maleic anhydride, itaconic acid, acrylonitrile, methacrylonitrile, acrylic acid, methacrylic acid, copolymerizable surfactants such as 2-acrylamido-2-methylpropanesulphonic acid (AMPS) or one of its salts, for example the sodium salt, and 2-sulphoethylmethacrylate acid (2-SEM) or one of its salts, for example the sodium salt, and also the phosphate ester of methacrylate-terminated polypropylene glycol (such as the product Sipomer PAM-200 from Rhodia) or one of its salts, for example the sodium salt.

The copolymer of the composition according to the invention is more particularly preferably a copolymer composed of vinylidene chloride in an amount of at least 50 wt %, of methyl acrylate and of at least one comonomer chosen from methyl methacrylate, ethyl acrylate, ethyl methacrylate, n-butyl acrylate, n-butyl methacrylate, 2-ethylhexyl acrylate and 2-ethylhexyl methacrylate, the comonomers corresponding to the formula $CH_2$=$CR_1R_2$ defined above other than the aforementioned alkyl (meth)acrylates, vinyl acetate, maleic anhydride, itaconic acid, acrylonitrile, methacrylonitrile, acrylic acid and methacrylic acid.

The copolymer of the composition according to the invention is most particularly preferably a copolymer composed of vinylidene chloride in an amount of at least 50 wt % and of methyl acrylate.

Advantageously, the amount of vinylidene chloride in the vinylidene chloride copolymers varies from 50 to 99 wt %, preferably from 60 to 98 wt %, particularly preferably from 70 to 97 wt % and more particularly preferably from 80 to 95 wt %.

Advantageously, the amount of copolymerizable comonomer(s) in the vinylidene chloride copolymers varies from 1 to 50 wt %, preferably from 2 to 40 wt %, particularly preferably from 3 to 30 wt % and more particularly preferably from 5 to 20 wt %.

In the most particularly preferable case of the copolymer composed of vinylidene chloride in an amount of at least 50 wt % and of methyl acrylate, the amount of methyl acrylate in the copolymer is advantageously at least 6, preferably at least 6.5, particularly preferably at least 6.7 and more particularly preferably at least 7 wt %. It is advantageously at most 9, preferably at most 8.7, particularly preferably at most 8.5 and more particularly preferably at most 8 wt %.

The vinylidene chloride copolymer of the composition according to the invention is advantageously characterized by a relative viscosity, measured in the manner described in the examples, of at least 1.44 and preferably of at least 1.45. It is advantageously characterized by a relative viscosity of at most 1.52 and preferably of at most 1.49.

The vinylidene chloride copolymer of the composition according to the invention is advantageously characterized by a melting point, measured in the manner described in the examples, between 145 and 180° C.

The vinylidene chloride copolymer of the composition according to the invention is advantageously characterized by a melting point of at least 145, preferably of at least 150 and particularly preferably of at least 155° C. It is advantageously characterized by a melting point of at most 180, preferably of at most 175, particularly preferably of at most 170, more particularly preferably of at most 165 and most particularly preferably of at most 160° C.

The amount of epoxidized soybean oil in the composition according to the invention is between 0.5 and 4 parts by weight per 100 parts by weight of (A).

The amount of epoxidized soybean oil is at least 0.5, preferably at least 0.75, particularly preferably at least 1, more particularly preferably at least 1.2 and most particularly preferably at least 1.4 parts by weight per 100 parts by weight of (A).

The amount of epoxidized soybean oil is at most 4, preferably at most 3, particularly preferably at most 2.5, more particularly preferably at most 2.3 and most particularly preferably at most 2 parts by weight per 100 parts by weight of (A).

A total amount of epoxidized soybean oil between 1 and 2 parts by weight per 100 parts by weight of (A) gives excellent results.

The composition according to the invention comprises (C) from 0.01 to 2 parts by weight, per 100 parts by weight of (A), of at least one fluoropolymer chosen from the amorphous fluoropolymers for which the glass transition temperature is less than or equal to 200° C. and the semi-crystalline fluoropolymers for which the melting point is less than or equal to 200° C.

The expression "at least one fluoropolymer" is understood to mean that the composition may comprise one or more of them. Preferably, it comprises only one of them.

In the remainder of the text, the expression "fluoropolymer" used in the singular or plural should be understood as denoting one or more fluoropolymers, except where denoted otherwise.

The fluoropolymers used in the compositions according to the invention are advantageously characterized by a number-average molecular weight, for example such as determined by size exclusion chromatography, by nuclear magnetic resonance or by elemental analysis, greater than 20,000, preferably greater than or equal to 30,000. The number-average molecular weight of these fluoropolymers is advantageously less than or equal to 2,000,000, preferably less than or equal to 1,000,000, particularly preferably less than or equal to 500,000 and more particularly preferably less than or equal to 250,000.

The term "fluoropolymer" is understood to mean both homopolymers of fluoromonomers and copolymers of the latter with at least one other comonomer.

The fluoropolymer is chosen from the amorphous fluoropolymers for which the glass transition temperature, advantageously measured in the manner described in the examples, is less than or equal to 200° C. and the semi-crystalline fluoropolymers for which the melting point, advantageously measured in the manner described in the examples, is less than or equal to 200° C.

The expression "amorphous fluoropolymers" is understood to mean the fluoropolymers that have no crystallinity and that therefore have no melting point. These fluoropolymers are characterized by a glass transition temperature that is less than or equal to 200° C. The amorphous fluoropolymers are characterized by a glass transition temperature that is preferably less than or equal to 190° C., particularly preferably less than or equal to 185° C., more particularly preferably less than or equal to 180° C. and most particularly preferably less than or equal to 170° C. Very good results have been obtained with amorphous fluoropolymers that are characterized by a glass transition temperature less than or equal to 165° C.

The expression "semi-crystalline fluoropolymers" is understood to mean the fluoropolymers that are characterized by a certain crystallinity and therefore by a melting point.

The melting point of the semi-crystalline fluoropolymers must be less than or equal to 200° C. The semi-crystalline fluoropolymers are characterized by a melting point that is preferably less than or equal to 190° C., particularly preferably less than or equal to 185° C., more particularly preferably less than or equal to 180° C. and most particularly preferably less than or equal to 170° C. Very good results have been obtained with semi-crystalline fluoropolymers that are characterized by a melting point less than or equal to 165° C.

Among the amorphous fluoropolymers for which the glass transition temperature is less than or equal to 200° C. or semi-crystalline fluoropolymers for which the melting point is less than or equal to 200° C., mention may be made of the fluoropolymers formed from at least two of the following monomers: vinylidene fluoride (VDF), hexafluoropropylene (HFP), hydropentafluoropropylene (HPFP), tetrafluoroethylene (TFE), ethylene, propylene, chlorotrifluoroethylene (CTFE) and perfluoroalkyl vinyl ethers (PAVEs) including perfluoromethyl vinyl ether (PMVE).

The fluoropolymer is advantageously chosen from the fluoropolymers formed from at least two of the following monomers: vinylidene fluoride (VDF), hexafluoropropylene (HFP), hydropentafluoropropylene (HPFP), tetrafluoroethylene (TFE), ethylene, propylene, chlorotrifluoroethylene (CTFE) and perfluoroalkyl vinyl ethers (PAVEs) including perfluoromethyl vinyl ether (PMVE).

The fluoropolymer is preferably chosen from the fluoropolymers based on VDF and the fluoropolymers based on TFE that do not comprise VDF.

Among the fluoropolymers based on VDF, mention may be made of the VDF/HFP, VDF/HFP/TFE, VDF/PMVE/TFE, VDF/CTFE, VDF/TFE/PMVE, VDF/TFE/propylene, VDF/HPFP, VDF/HPFP/TFE and VDF/HFP/ethylene fluoropolymers.

Among the fluoropolymers based on TFE that do not comprise VDF, mention may be made of the TFE/PMVE, TFE/propylene and TFE/PMVE/ethylene fluoropolymers.

The fluoropolymer is particularly preferably chosen from the fluoropolymers based on VDF and more particularly preferably from the VDF/HFP fluoropolymers and the VDF/HFP/TFE (or TFE/HFP/VDF) fluoropolymers.

The fluoropolymer may be a fluoroplastic or a fluoroelastomer.

The term "fluoroplastics" is understood to mean the fluoropolymers that exist at ambient temperature, below their glass transition temperature if they are amorphous or below their melting point if they are semi-crystalline, and which are linear (uncrosslinked). These fluoropolymers have the property of becoming soft when they are heated and of becoming rigid again when they are cooled, without appreciable chemical change. Such a definition can be found, for example, in the encyclopaedia entitled "Polymer Science Dictionary", Mark S. M. Alger, London School of Polymer Technology, Polytechnic of North London, UK, published by Elsevier Applied Science in 1989.

Fluoroplastics preferably comprise more than 75 wt %, particularly preferably more than 90 wt % and more particularly preferably more than 97 wt % of repeat units derived from fluoromonomers.

Among the particularly interesting fluoroplastics, mention may be made, for example in a non-limiting manner, of the VDF/HFP SOLEF® and HYLAR® fluoroplastics and the VDF/HFP/TFE DYNAMAR™ fluoroplastics.

The term "fluoroelastomers" is understood to mean true elastomers or the fluoropolymers serving as a base constituent for obtaining a true elastomer, comprising more than 50 wt % of repeat units derived from at least one ethylenically unsaturated monomer comprising at least one fluorine atom.

True elastomers are defined by the ASTM, Special Technical Bulletin, No. 184 standard as materials capable of being stretched, at ambient temperature, to twice their intrinsic length and which, once they have been released after holding them under tension for 5 minutes, return to within 10% of their initial length in the same time.

Fluoroelastomers are generally amorphous or are characterized by a low degree of crystallinity (crystalline phase less than 20% by volume) and a glass transition temperature ($T_g$) below ambient temperature. In most cases, fluoroelastomers have a $T_g$ below 0° C. Fluoroelastomers have a heat of fusion, as determined according to the ASTM D 3418 standard, advantageously of less than 1 J/g, preferably of less than 0.5 J/g. Particularly preferably, fluoroelastomers have no detectable melting point, in other words they have an undetectable heat of fusion.

Fluoroelastomers preferably comprise more than 75 wt %, particularly preferably more than 90 wt % and more particularly preferably more than 97 wt % of repeat units derived from fluoromonomers.

Among the particularly interesting fluoroelastomers, mention may be made, for example in a non-liming manner, of the VDF/HFP TECNOFLON® fluoroelastomers, the VDF/HFP/TFE TECNOFLON® fluoroelastomers, the VDF/PMVE/TFE TECNOFLON® fluoroelastomers, the TFE/PMVE TECNOFLON® fluoroelastomers and the VDF/HFP DYNAMAR™ fluoroelastomers.

Among the very particularly interesting fluoroelastomers, mention may be made, for example in a non-limiting manner, of the VDF/HFP TECNOFLON®NM Powder fluoroelastomer that is in the form of a powder at ambient temperature, which is characterized by a glass transition temperature of −24° C. and which does not have a melting point as well as the VDF/HFP DYNAMAR™FX9613 fluoroelastomer that is in the form of a powder at ambient temperature, which is characterized by a glass transition temperature of −22° C. and that does not have a melting point.

The amount of fluoropolymers in the composition according to the invention is between 0.01 and 2 parts by weight per 100 parts by weight of (A). A composition comprising from 0.01 to 0.1 part by weight per 100 parts by weight of (A) is preferred.

The total amount of fluoropolymers is at least 0.01, preferably at least 0.02 and particularly preferably at least 0.03 part by weight per 100 parts by weight of (A).

The total amount of fluoropolymers is at most 2, preferably at most 1.5, particularly preferably at most 1, more particularly preferably at most 0.5 and most particularly preferably at most 0.25 part by weight per 100 parts by weight of (A). A total amount of fluoropolymers of at most 0.1 part by weight per 100 parts by weight of (A) provides very good results.

The composition according to the invention comprises (D) at most 1 part by weight, per 100 parts by weight of (A), of at least one acid scavenger.

The expression "at least one acid scavenger" is understood to mean that the composition may comprise one or more of them. Preferably, it comprises only one of them.

In the remainder of the text, the expression "acid scavenger" used in the singular or plural should be understood as denoting one or more acid scavengers, except where denoted otherwise.

The expression "acid scavenger" is understood to mean any compound capable of scavenging acids present in the medium. The acid scavenger is preferably a hydrochloric acid scavenger.

The acid scavenger is advantageously chosen from calcium carbonate, magnesium aluminium hydrogencarbonates, magnesium oxides, magnesium aluminium oxides, tetrasodium pyrophosphate and metal salts of fatty acids.

Among the magnesium aluminium hydrogencarbonates (hydrotalcites), mention may be made of those corresponding to the general formula $Mg_4Al_2(OH)_{12}CO_3 \cdot nH_2O$ such as the commercial products DHT4A® or ALCAMIZER®.

The acid scavenger is preferably chosen from calcium carbonate and magnesium aluminium hydrogenocarbonates.

The acid scavenger is particularly preferably calcium carbonate.

The composition according to the invention preferably comprises a single acid scavenger which is calcium carbonate.

Any grade of calcium carbonate may be used. The calcium carbonate may or may not be precipitated. It may or may not be coated. Among the various grades of calcium carbonate available, coated precipitated calcium carbonate is preferred.

A calcium carbonate that is characterized by a particle diameter, measured by permeability, between 0.05 and 0.09 µm is particularly preferred.

The acid scavenger is present in the composition in an amount of at most 1 part by weight relative to the total weight of the composition. The composition according to the invention preferably comprises at most 0.8, particularly preferably at most 0.6 and more particularly preferably at most 0.5 part by weight of at least one acid scavenger per 100 parts by weight of (A). The composition according to the invention advantageously comprises at least 0.05, preferably at least 0.1, particularly preferably at least 0.15 and more particularly preferably at least 0.2 part by weight of at least one acid scavenger per 100 parts by weight of (A).

A composition comprising from 0.1 to 0.5 part by weight of at least one acid scavenger per 100 parts by weight of (A) provides very good results.

Besides (A), (B), (C) and (D), the composition according to the invention may also, in addition, comprise (E) optionally at least one ε-caprolactone polymer.

The expression "ε-caprolactone polymer" is understood to denote both the homopolymers of ε-caprolactone (or 2-oxepanone) and the copolymers thereof with at least one other comonomer.

Depending on their molecular weight, the ε-caprolactone polymers may be in the form of a solid (powder or granules), in the form of a viscous product (paste, wax, etc.) or in the form of a liquid at ambient temperature. Generally, the ε-caprolactone polymers whose molecular weight is greater than 10,000 g/mol are in solid form at ambient temperature whereas those whose molecular weight is less than or equal to 10,000 g/mol are instead in the form of a viscous product or a liquid.

Some ε-caprolactone polymers that are particularly well suited for preparing the composition according to the invention are the ε-caprolactone polymers sold by Solvay Interox Limited under the trademark CAPA®.

The expression "at least one ε-caprolactone polymer" is understood to mean that the composition may comprise one or more ε-caprolactone polymers.

When it comprises several ε-caprolactone polymers, the composition preferably comprises at least one ε-caprolactone polymer characterized by a molecular weight less than or equal to 10,000 g/mol.

Thus, besides an ε-caprolactone polymer characterized by a molecular weight less than or equal to 10,000 g/mol, other ε-caprolactone polymers that are characterized either by a molecular weight less than or equal to 10,000 g/mol, or by a molecular weight greater than 10,000 g/mol, may be present in the composition. In the case where at least one polymer having a molecular weight greater than 10,000 g/mol is present in the composition, their amount does not advantageously exceed 50% and preferably not 45% of the total weight of ε-caprolactone polymer(s).

When at least one ε-caprolactone copolymer is present in the composition according to the invention, the total amount of this (these) ε-caprolactone polymer(s) is at least 1, preferably at least 2 and particularly preferably at least 3 parts by weight per 100 parts by weight of (A).

When at least one ε-caprolactone copolymer is present in the composition according to the invention, the total amount of this (these) ε-caprolactone polymer(s) is at most 50, preferably at most 30, particularly preferably at most 20 and more particularly preferably at most 15 parts by weight per 100 parts by weight of (A).

A total amount of ε-caprolactone polymer(s) between 3 and 15 parts by weight per 100 parts by weight of (A) is more particularly preferred when at least one ε-caprolactone copolymer is present in the composition according to the invention.

Besides (A), (B), (C), (D) and optionally (E), the composition according to the invention may comprise (F) optionally other compounds that do not have effects on the barrier properties to gases and odours or on the thermal stability during use of the composition such as, for example, the pigments or dyes, UV stabilizers and antioxidants commonly used. These compounds are then advantageously introduced in commonly used amounts.

Preferably, the composition of a vinylidene chloride copolymer according to the invention consists essentially in the compounds (A), (B), (C), (D), optionally (E) and/or optionally (F) as defined above.

The expression "consists essentially in" is understood to mean that, besides the principal compounds (A), (B), (C), (D), optionally (E) and/or optionally (F), the composition according to the invention only comprises compounds present in trace amounts.

According to a first variant, the composition of a vinylidene chloride copolymer according to the invention consists essentially in the compounds (A), (B), (C), (D), optionally (E) and optionally (F) as defined above.

According to a second variant, the composition of a vinylidene chloride copolymer according to the invention consists essentially in the compounds (A), (B), (C), (D) and optionally (F) as defined above.

According to a third variant, the composition of a vinylidene chloride copolymer according to the invention consists essentially in the compounds (A), (B), (C), (D) and optionally (E) as defined above.

Particularly preferably, the composition of a vinylidene chloride copolymer according to the invention consists essentially in the compounds (A), (B), (C) and (D).

The composition according to the invention may be prepared by any preparation process.

According to a first variant, the composition according to the invention is prepared by mixing (A), (B), (C) and (D) via premixing.

One subject of the present invention is therefore a process for preparing a composition according to the invention characterized in that it comprises the mixing of (A), (B), (C) and (D) via premixing.

When the composition comprises (E) and/or (F), the latter are advantageously mixed with (A) via premixing, as defined for (B), (C) and (D) in the first variant in the preceeding text and the following text.

The term "premixing" is understood to mean any method that includes the use of a mixer and that makes it possible to carry out the mixing of the various components of the composition according to the invention.

A first preferred method of premixing uses a double-chamber rapid mixer. Thus, (1) advantageously introduced into a first possibly heated and stirred chamber are all of (A) and the solid additive(s), as is or as a masterbatch with a small amount of (A). (2) The liquid additive(s), temperature-conditioned in a subsidiary reservoir, are then advantageously introduced when the temperature in the hot chamber reaches the target value. The solid additive(s) may also be introduced during this step. (3) Once the temperature is reached, the mixture is then advantageously transferred into a second cold chamber, also with stirring and which has a jacket in which low-temperature water circulates. (4) The mixture advantageously continues to be stirred therein to an established temperature. During this phase, one or some of the solid additives may also be added, preferably at the beginning of step (4). (5) Once the contents of the chamber are cooled, the chamber is emptied.

A second method of premixing advantageously uses a slow mixer of the Patterson CONAFORM® type, composed of a single jacketed chamber, into which vapour may be injected, having a slow rotation and possibly being under vacuum. The steps are quite similar to those of the first method, with introduction of (A) and of the solid additive(s) before heating the chamber, addition of the preheated liquid additive(s), when a certain temperature is reached and after homogenization at a defined temperature and for a certain time period, and finally start of the cooling phase during which it is still possible to introduce one or some solid additive(s).

According to a second variant, the composition according to the invention is prepared by mixing of (A) containing at least one part of (B) and/or at least one part of (C), the optional balance of (B), the optional balance of (C), and (D) via premixing.

Another subject of the present invention is therefore a process for preparing a composition according to the invention, characterized in that it comprises the mixing of (A) containing at least one part of (B) and/or at least one part of (C), the optional balance of (B), the optional balance of (C), and (D) via premixing.

When the composition comprises (E) and/or (F), at least one part of (E) and/or at least one part of (F) may advantageously be mixed with (A) beforehand and the optional balance of (E) and/or the optional balance of (F) added next via premixing, as defined for (B) and (C) in the second variant in the preceeding text and the following text.

At least one part of (B) and/or at least one part of (C) are thus advantageously mixed with (A) before the premixing step. At least one part of (B) and/or at least one part of (C) are preferably mixed with (A) during the step of preparing (A) by polymerization of the vinylidene chloride and of the comonomers copolymerizable with the latter.

The step of preparing (A) by polymerization of the vinylidene chloride and of the comonomers copolymerizable with the latter advantageously breaks down into the sub-steps according to which:

a1) at least one fraction of the raw materials needed for the polymerization is introduced into a reactor;

a2) the contents of the reactor are reacted while optionally introducing the balance of said raw materials and, after reaction, a slurry containing the residual monomers is obtained;

a3) the residual monomers are removed from the slurry obtained in sub-step a2) and a slurry purified of the residual monomers is obtained; and a4) the vinylidene chloride copolymer is isolated from the slurry obtained in sub-step a3).

According to sub-step a1) of the process according to the invention, at least one fraction of the raw materials needed for the polymerization are advantageously introduced into a reactor.

The expression "raw materials" is understood to mean all the ingredients needed for the polymerization, especially water, the dispersant(s), the radical generator(s), the vinylidene chloride and the comonomer(s) copolymerizable with the latter.

The raw materials may be introduced in any order during sub-step a1).

The expression "at least one fraction of the raw materials needed for the polymerization" is understood to mean that at least one part of the raw materials is added is added in sub-step a1).

According to sub-step a2) of the process according to the invention, the contents of the reactor are advantageously reacted while optionally introducing the balance of said raw materials and, after reaction, a slurry containing the residual monomers is obtained.

In order to make the contents of the reactor react according to sub-step a2), means are advantageously used by which radicals are generated within it. For this purpose, it is especially possible to heat the contents of the reactor or to expose the contents to an intense light radiation. Preferably, the contents of the reactor are heated.

The temperature at which the contents of the reactor are reacted is advantageously equal to at least 30° C. In addition, it is advantageously equal to at most 200° C., preferably at most 120° C. and particularly preferably at most 80° C.

Advantageously, sub-step a2) is continued until the vinylidene chloride and the comonomer or comonomers with which it is copolymerizable have reacted to a certain extent. Sub-step a2) is continued until the degree of conversion of the monomers is preferably at least 80%. Sub-step a2) is continued until the degree of conversion of the monomers is preferably at most 100%.

The balance of the raw materials needed for the polymerization is optionally introduced during sub-step a2). Preferably, all the raw materials needed for the polymerization are introduced during step a1).

At the end of sub-step a2), a slurry containing the residual monomers is advantageously obtained.

The expression "residual monomers" is understood to mean the monomers which have not reacted and which are in the polymerization medium.

According to sub-step a3) of the process according to the invention, the residual monomers are removed from the slurry obtained in sub-step a2) and a slurry purified of the residual monomers is obtained.

Any means of removing the residual monomers from the slurry obtained in sub-step a2) may be used. Preferably, the removal (known as stripping) of the residual monomers from the slurry obtained in sub-step a2) is carried out by stripping under vacuum or else by stripping under vacuum and simultaneously injecting steam into the slurry. Advantageously, the abovementioned stripping is followed by a cooling phase.

At the end of sub-step a3), a slurry purified of the residual monomers is advantageously obtained.

According to step a4) of the process according to the invention, the vinylidene chloride polymer is advantageously isolated from the slurry obtained in sub-step a3).

Sub-step a4) is preferably carried out by filtering the slurry obtained in sub-step a3) followed by washing and drying of the cake obtained after filtering and packaging of the vinylidene chloride copolymer to be transported.

At least one part of (B) and/or at least one part of (C) may therefore be introduced in any of sub-steps a1), a2), a3) or a4) or in several of these sub-steps.

Introduction in sub-step a1) and in sub-step a2) is understood to mean that (B) and/or (C) are introduced into the polymerization reactor independently of the raw materials or that they are mixed beforehand to one or several of them, preferably to one of the monomers or to the monomers mixture.

Preferably, at least one part of (B) and/or at least one part of (C) are introduced during sub-step a1), during sub-step a2), advantageously at the end of this sub-step, during sub-step a3) or during each of them. Particularly preferably, at least one part of (B) and/or at least one part of (C) are introduced during sub-step a1), during sub-step a3) or during each of them.

According to this second variant, the premixing step may take place quite independently of the polymerization step or may take place in line with this polymerization step.

The expression "take place quite independently of the polymerization step" is understood to mean that the premixing step takes place after sub-step a4) is completed. It may then take place on the same site or on site different from that where the polymerization step took place.

When the premixing step takes place quite independently of the polymerization step, the first and second premixing methods explained in detail for the first variant of the process for preparing a composition according to the invention above may be used, with a preference for the first method.

The expression "take place in line with the polymerization step" is understood to mean that the premixing step is an integral part of the polymerization step. The premixing step then preferably takes place during sub-step a4) after drying and before packaging.

When the premixing step takes place in line with the polymerization step, one preferred premixing method uses a ploughshare mixer in which (A) containing the liquid additive(s) introduced during the polymerization step, is mixed with a masterbatch containing the solid additive(s). The premixing time is advantageously very short (around 3 min) since it does not involve heating the copolymer. Feeding of the mixer is furthermore advantageously carried out automatically via a gravimetric weighing system.

According to a third variant, the composition according to the invention is prepared by mixing (A) with a mixture of (B), (C) and (D) produced previously.

Another subject of the present invention is therefore a process for preparing a composition according to the invention characterized in that it comprises the mixing of (A) with a mixture of (B), (C) and (D) produced previously.

When the composition comprises (E) and/or (F), (E) and/or (F) may advantageously be mixed with (B), (C) and (D) beforehand prior to being mixed with (A), as defined for (B), (C) and (D) in the third variant in the preceeding text and the following text.

According to this third variant, the composition according to the invention is advantageously prepared by first mixing (B) with (C) and (D), preferably via premixing, particularly preferably by introducing (C) and (D) via premixing into (B) preheated beforehand. The premixing is more particularly preferably followed by a grinding.

The mixture of (B), (C) and (D) is then more particularly preferably mixed with (A) either during the step of preparing (A) by polymerization of vinylidene chloride and comonomer(s) copolymerizable with it, or via premixing with (A).

When it is mixed with (A) during the step of preparing (A) by polymerization of vinylidene chloride and comonomer(s) copolymerizable with it, the mixture of (B), (C) and (D) may be introduced in any of sub-steps a1), a2), a3) or a4), as defined above for the second variant, or in several of these sub-steps, with the same definitions and preferences of introduction than those defined for the second variant.

Another subject of the present invention is a multilayer film which comprises a composition according to the invention.

The multilayer film preferably comprises a barrier layer comprising a composition according to the invention.

The multilayer film according to the invention may be of various types. Thus, the multilayer film may be a shrinkable film or a blown film.

The shrinkable film advantageously comprises at least 3 layers and preferably at least 5 layers. It is advantageously biaxially oriented. It is furthermore advantageously 40 to 60% shrinkable.

The blown film advantageously comprises at least 3 layers, preferably at least 5 layers, particularly preferably at least 7 layers and more particularly preferably at least 9 layers. It is advantageously not very or not at all shrinkable. Such a film may be used as is, laminated or thermoformed.

The film according to the invention may also be a cast film. The cast film advantageously comprises at least 3 layers and preferably at least 5 layers.

Finally, one subject of the present invention is a packaging or bag formed from a film according to the invention.

The packaging or bag may be intended for any use. Preferably, it is intended for food packaging, for example for packaging meat, milk, spices, oils or cheese.

The vinylidene chloride copolymer compositions according to the invention have the advantage of being characterized by an excellent thermal stability. During their use, layers of degraded polymer are not formed on any metal part of the implementation equipment with which the polymer is in contact, in particular deposits on the die, which would affect the quality of the films obtained, are not formed. The latter are moreover characterized by excellent barrier properties to gases and odours; which allows them to be used for producing multilayer-type films that are highly sought after in the food packaging field.

The following examples are intended to illustrate the invention without however limiting the scope thereof.

Products Used

Various vinylidene chloride copolymers were used, namely:
 the copolymer IXAN®PV917, which is a copolymer of vinylidene chloride and methyl acrylate containing 8 wt % of methyl acrylate and that is moreover characterized by a relative viscosity of 1.46 and a melting point of 155° C.;
 the copolymer IXAN®PV891, which is a copolymer of vinylidene chloride and methyl acrylate containing 8 wt % of methyl acrylate and that is moreover characterized by a relative viscosity of 1.46 and a melting point of 155° C.; and
 the copolymer IXAN®PV700, which is a copolymer of vinylidene chloride and vinyl chloride containing 17 wt % of vinyl chloride and that is moreover characterized by a relative viscosity of 1.57 and a melting point of 162° C.

The epoxidized soybean oil that was used was the epoxidized soybean oil EDENOL®D82H, the level of epoxy bridges of which was between 6 and 7%.

Various fluoropolymers were used, namely:
 the VDF/HFP fluoropolymer TECNOFLON®NM Powder that is in the form of a powder at ambient temperature, which is characterized by a glass transition temperature of −24° C. and that does not have a melting point;
 the VDF/HFP fluoropolymer SOLEF®21508/1001 that is in the form of a powder at ambient temperature, which is characterized by a glass transition temperature of −26° C. and a melting point of 138° C.;
 the VDF/HFP fluoropolymer SOLEF®11010/1001 that is in the form of a powder at ambient temperature, which is characterized by a glass transition temperature of −37° C. and a melting point of 158° C.;
 the VDF/HFP/TFE fluoropolymer DYNAMAR™FX5911 that is in the form of a powder at ambient temperature, which is characterized by a glass transition temperature of −4° C. and a melting point of 116° C.;
 the VDF/HFP fluoropolymer DYNAMAR™FX9613 that is in the form of a powder at ambient temperature, which is characterized by a glass transition temperature of −22° C. and that does not have a melting point; and
 the PTFE fluoropolymer DYNEON™MM5935EF that is in the form of a powder at ambient temperature which is characterized by a glass transition temperature of −80° C. and a melting point of 327° C.

An acrylic polymer was used. This was the acrylic polymer PLASTISTRENGTH™L1000 which is a copolymer composed of methyl methacrylate, n-butyl methacrylate and n-butyle acrylate that is in the form of a powder at ambient temperature, which is characterized by a glass transition temperature of −31° C. and a second one of 116° C. and that does not have a melting point.

The calcium carbonate that was used was the calcium carbonate SOCAL®312 that is in the form of a nanometer-size powder (particle diameter, measured by permeability, of 0.07 μm), that is characterized by a (BET) specific surface area, measured according to the ISO 9277 standard, of 19 m$^2$/g and a free-flowing density, measured according to the ISO 903 standard, of 286 g/l.

Measurement of the Relative Viscosity of the Vinylidene Chloride Copolymer

The relative viscosity of the vinylidene chloride copolymer was measured according to the ISO 3105 or DIN 51562 standard using an UBBELHODE viscometer of constant K=0.003. The solution of the vinylidene chloride copolymer was produced in tetrahydrofuran at a concentration of 5 g/l. The viscosity measurement was carried out at 20° C.

Measurement of the Glass Transition Temperature and of the Melting Point of the Polymers The glass transition temperature and the melting point of the polymers have been measured by DSC (Differential Scanning calorimetry) according to the ASTM D 3418-03 standard. The specific measurement conditions were:
 machine: TA Instruments Q100 DSC;
 reference standard: 99.999% pure indium;
 sample size: 19+/−5 mg;
 temperature gradient: 10° C./min;
 profil temperature:
  first heating to erase the thermal history: −100° C. to end of melting;
  cooling from end of melting to −100° C.; and
  second heating to determine the glass transition temperature and the melting point: −100° C. to end of melting.

The melting point was determined from the thermogram obtained during the second heating and corresponds to the maximum of the intensity of the peak, that is to say, to the maximum of the endothermic phenomenon observed during the heating. The melting point is expressed in ° C. to within 1° C.

The glass transition temperature was determined from the thermogram obtained during the second heating and correspond to the midpoint of slope change. The glass transition temperature is expressed in ° C. to within 1° C.

Determination of the Amount of Fluoropolymer in the Composition

The amount of fluoropolymer in the composition of a vinylidene chloride copolymer was determined by mass balance.

Determination of the Amount of Acid Scavenger in the Composition

The amount of acid scavenger in the composition of a vinylidene chloride copolymer was determined by mass balance.

Determination of the Amount of Epoxidized Soybean Oil in the Composition

The amount of epoxidized soybean oil in the composition of a vinylidene chloride copolymer was determined by mass balance or by thin-layer chromatography using an epoxidized soybean oil standard. The sample subjected to chromatography was obtained by dissolving the composition of a vinylidene chloride copolymer in tetrahydrofuran; an operation followed by precipitation in methanol. The precipitated part was then filtered and put back into solution in tetrahydrofuran before being subjected to a second precipitation. The two soluble fractions were then brought together and concentrated using an evaporator. The concentrate obtained was subjected to thin-layer chromatography. After migration, a developing agent was used and a densitometry measurement was carried out.

Measurement of the Thermal Stability of a Vinylidene Chloride Copolymer Composition The principle of the thermal stability measurement consists in processing the vinylidene chloride copolymer composition in a mixing chamber conditioned at a defined temperature (160° C. when the compositions comprise the IXAN®PV917 or IXAN®PV891 copolymers and 170° C. when the compositions comprise the IXAN®PV700 copolymer) so as to analyse its behaviour under stress and to reach a conclusion as to its ability to be able to be used in an extrusion machine.

The machine used for the measurement was a Brabender PL2100 Plasti-Corder machine.

In order to carry out the measurement, the hopper positioned above the mixing chamber of the machine was filled with 95 g of the sample. A pressure was exerted over the hopper using a gauge, so that the entirety of the sample was introduced into the mixing chamber. Identification of the torque (Nm) on the force scale could be carried out to stop the pressure on the gauge. The gauge and the hopper were then removed. The introduction of the sample into the mixing chamber constituted the automatic starting point of the test and of the time countdown. The variation of the torque and the material temperature (+/−5° C. with respect to the setpoint) were monitored throughout the duration of the test.

A sample was removed in the 6$^{th}$ minute and every 3 minutes afterwards throughout the duration of the test until 5 to 10 minutes after the change in the slope of the torque. The material removed was then made into a ball shape and put in a press for one minute. The pellet thus obtained was then cut along the diameter ad hoc using a calibre punch and bonded to the test processing sheet. The decomposition stage was visualized either by a dark brown coloration of the pellet or by a change in the slope of the torque curve. Continuing the test for 5 to 10 minutes allowed an easier and more precise determination of the decomposition point and the corresponding temperature. The thermal stability as determined is therefore the time, expressed in minutes, corresponding to the decomposition point.

Production of Films from a Vinylidene Chloride Copolymer Composition

Films were prepared from the vinylidene chloride copolymer compositions in question via the examples that follow.

For this, a three-layer film A/B/A (A=ethylene/vinyl acetate polymer ESCORENE® UL309 from Exxon Mobil, B=vinylidene chloride copolymer composition) was produced by coextrusion using two extruders, a feed block with four temperature zones and a 200×0.6 mm sheet die. On exiting the die, the film was cooled and drawn, to a greater or lesser extent, in the machine direction by a 3-roll calender.

For each vinylidene chloride copolymer composition tested, seven films with thicknesses varying from 10 to 60 µm were produced by varying the drawing rate of the film.

The seven films were stored at 23° C. and 50% relative humidity for at least 7 days before the measurement.

Determination of the Level of Fish Eyes in the Films

The principle of the method consists in classifying the films relative to an internal scale of films having various levels of fish eyes, namely from 1 (no fish eyes) to 5 (very many fish eyes).

For that, the operator examined each film and compared it to the five reference films. Each film was thus given a rating from 1 to 5.

Measurement of the Oxygen Transmission Rate of the Films

The principle of the method consists in determining the amount of oxygen which passes through a film of a vinylidene chloride copolymer composition, per unit time and unit area, for a defined temperature and relative humidity.

For this, the film was placed in a cell so that it separates this cell into two. The first part was supplied with oxygen and the second flushed with nitrogen. The oxygen which passed through the film was transported by the nitrogen to the coulometric detector. The latter thus determined the amount of oxygen per unit time. Knowing the surface area of the cell, the amount of oxygen in cm$^3$ per day and per m$^2$ was determined.

The machine used was an OX-TRAN 1000—H HUMIDICON or MOCON 2/21 (Mocon) machine, conditioned at 23° C. and 85% relative humidity.

The measurements were carried out on films stored at 23° C. and 50% relative humidity for 7 days minimum and 15 days maximum.

The thickness of layer B of the film was measured before carrying out the measurement of the oxygen transmission rate.

The oxygen transmission rate was measured for the seven films with different thicknesses, produced for each vinylidene chloride copolymer composition, thus giving 7 oxygen permeability measurements.

A logarithmic regression of the transmission rate as a function of the thickness was then carried out in order to calculate the transmission rate for a standard thickness of layer B of 10 µm.

The value of the oxygen transmission rate for the films (PO$_2$) was thus determined. The oxygen transmission rate is therefore expressed in cm$^3$/m$^2$·day·atm for a thickness of 10 µm at 23° C.

Measurement of the Water Vapour Transmission Rate of the Films

The principle of the method consists in determining the amount of water vapour which passes through a film of a vinylidene chloride copolymer composition, per unit time and unit area, for a defined temperature and relative humidity.

For this, the film was placed in a cell so that it separates this cell into two. The first part was held in a 90% humid atmosphere and the second flushed with nitrogen. The water vapour which passed through the film was transported by the nitrogen to the infrared detector. The latter thus determined the amount of water vapour per unit time. Knowing the surface area of the cell, the amount of water vapour in g per day and per m² was determined.

The machine used was a MOCON 3/31 machine, conditioned at 38° C. and 90% relative humidity.

The measurements were carried out on films stored at 23° C. and 50% relative humidity for 7 days minimum and 15 days maximum.

The thickness of layer B of the film was measured before carrying out the measurement of the water vapour transmission rate.

The water vapour transmission rate was measured for three of the seven films with different thicknesses, produced for each vinylidene chloride copolymer composition, thus giving three water vapour permeability measurements.

A logarithmic regression of the transmission rate as a function of the thickness was then carried out in order to calculate the transmission rate for a standard thickness of layer B of 10 µm.

The value of the water vapour transmission rate for the films ($PH_2O$) was thus determined. The water vapour transmission rate is therefore expressed in g/m²·day for a thickness of 10 µm at 38° C.

Determination of Die Deposits

The principle of the method consists in determining the appearance time and the amount of deposits on the die of a vinylidene chloride copolymer composition when it is extruded (deposits of a layer of the degraded composition).

For this, a vinylidene chloride copolymer composition was extruded using a Brabender extruder with a diameter of 30 mm and a length 20 D equipped with a tubular die having an outer diameter of 40 mm and a die gap of 0.5 mm. A high temperature profile and a slow screw speed were intentionally chosen in order to thermally stress the composition via high temperatures and a long residence time.

The measurement conditions were the following:

Temperature profile of the extruder barrel:
150-153-155° C. when the compositions comprise the IXAN®PV917 or IXAN®PV891 copolymers; and
150-158-165° C. when the compositions comprise the IXAN®PV700 copolymer.

Profile of the adapter:
155° C. when the compositions comprise the IXAN®PV917 or IXAN®PV891 copolymers; and
165° C. when the compositions comprise the IXAN®PV700 copolymer.

Temperature profile of the die: 165° C.

Screw speed of the extruder: 30 rpm, which corresponds to a throughput of +/−7 kg/h.

Starting was carried out on a clean machine (complete disassembly and cleaning of the whole machine). The extrusion lasted at most 6 h. The deposition of a layer of brown or blackish material on the edge of the die was observed by the operator. Photos of the die were taken every 30 minutes. The test was stopped before the 6 h of extrusion if an excess of deposit was visible.

EXAMPLE 1

According to the Invention

The vinylidene chloride copolymer IXAN®PV917 was mixed via premixing with the epoxidized soybean oil before the addition of the fluoropolymer TECNOFLON®NM Powder and the calcium carbonate SOCAL®312 in the manner described below. A composition was thus produced.

For that, the vinylidene chloride copolymer was placed in a chamber at ambient temperature and stirred at 600 rpm. After 180 seconds, the epoxidized soybean oil preheated to 55° C. was introduced by spraying. A masterbatch composed of the same vinylidene chloride copolymer (1 part by weight), fluoropolymer (0.05 part by weight) and calcium carbonate (0.3 part by weight) was then added. The stirring was continued until a time of 480 seconds before the contents of the chamber were discharged to another chamber stirred at 170 rpm and equipped with a jacket in which water circulated allowing the contents of the chamber to be cooled. The temperature of the composition was therefore lowered in this way until it was below 30° C. The composition was then recovered.

Several films were then produced using the vinylidene chloride copolymer composition obtained in Example 1 in the manner described previously.

The table below identifies the composition as regards the amount and nature of each constituent and details the properties of this composition measured in the manner described above, namely the thermal stability, the level of fish-eyes, the oxygen transmission rate $PO_2$, and the water vapour transmission rate $PH_2O$ measured and also the die deposits.

EXAMPLE 2

Comparative

Example 1 was reproduced without adding the calcium carbonate SOCAL®312.

EXAMPLE 3

Comparative

Example 1 was reproduced without adding the calcium carbonate SOCAL®312 and the fluoropolymer TECNOFLON®NM Powder.

EXAMPLE 4

According to the Invention

Example 1 was reproduced while replacing the fluoropolymer TECNOFLON®NM Powder with the fluoropolymer SOLEF®21508/1001.

EXAMPLE 5

According to the Invention

Example 1 was reproduced while replacing the fluoropolymer TECNOFLON®NM Powder with the fluoropolymer SOLEF®11010/1001.

EXAMPLE 6

According to the Invention

Example 1 was reproduced while replacing the fluoropolymer TECNOFLON®NM Powder with the fluoropolymer DYNAMAR®FX5911.

EXAMPLE 7

According to the Invention

Example 1 was reproduced while replacing the fluoropolymer TECNOFLON®NM Powder with the fluoropolymer DYNAMAR®FX9613.

EXAMPLE 8

Comparative

Example 1 was reproduced while replacing the fluoropolymer TECNOFLON®NM Powder with the fluoropolymer PTFE DYNEON® MMM5935EF.

During the preparation of the films, preferential flows and a high number of large unmelted fragments were observed, rendering the films unusable. The oxygen transmission rate $PO_2$, and the water vapour transmission rate $PH_2O$ could therefore not be measured.

EXAMPLE 9

Comparative

Example 1 was reproduced while replacing the fluoropolymer TECNOFLON®NM Powder with the acrylic polymer PLASTISTRENGTH™L1000.

EXAMPLE 10

According to the Invention

Example 1 was reproduced while adding 0.1 part of fluoropolymer TECNOFLON®NM Powder instead of 0.05 part.

EXAMPLE 11

According to the Invention

Example 1 was reproduced while replacing the vinylidene chloride copolymer IXAN®PV917 with the vinylidene chloride copolymer IXAN®PV891.

EXAMPLE 12

Comparative

Example 1 was reproduced while replacing the vinylidene chloride copolymer IXAN®PV917 with the vinylidene chloride copolymer IXAN®PV700.

EXAMPLE 13

Comparative

Example 12 was reproduced while adding 0.1 part of fluoropolymer TECNOFLON®NM Powder instead of 0.05 part and without adding the calcium carbonate SOCAL®312.

TABLE

| | PVDC | Fluoropolymer or acrylic polymer | Calcium carbonate | Thermal stability | Level of fish-eyes | $PO_2$ | $PH_2O$ | Die deposits |
|---|---|---|---|---|---|---|---|---|
| 1 | 100 parts IXAN ®PV917 PVDC | 0.05 part TECNOFLON ®NM fluoropolymer | 0.3 part SOCAL ®312 $CaCO_3$ | 17 | 1 | 4.7 | 2.2 | no die deposit after 360 min of observation |
| 2(C) | 100 parts IXAN ®PV917 PVDC | 0.05 part TECNOFLON ®NM fluoropolymer | / | 15 | 1 | 3.6 | 2.4 | no die deposit after 360 min of observation |
| 3(C) | 100 parts IXAN ®PV917 PVDC | / | / | 13 | 1 | 4.2 | 2.1 | Slight deposit after 120 min |
| 4 | 100 parts IXAN ®PV917 PVDC | 0.05 part SOLEF ® 21508/1001 fluoropolymer | 0.3 part SOCAL ®312 $CaCO_3$ | 19 | 1 | 4.1 | 2.0 | no die deposit after 360 min of observation |
| 5 | 100 parts IXAN ®PV917 PVDC | 0.05 part SOLEF ® 11010/1001 fluoropolymer | 0.3 part SOCAL ®312 $CaCO_3$ | 19 | 1 | 4.1 | 2.2 | no die deposit after 360 min of observation |
| 6 | 100 parts IXAN ®PV917 PVDC | 0.05 part DYNAMAR ™ FX5911 fluoropolymer | 0.3 part SOCAL ®312 $CaCO_3$ | 19 | 2 | 4.0 | 1.6 | no die deposit after 360 min of observation |
| 7 | 100 parts IXAN ®PV917 PVDC | 0.05 part DYNAMAR ™ FX9613 fluoropolymer | 0.3 part SOCAL ®312 $CaCO_3$ | 19 | 2 | 4.0 | 2.1 | no die deposit after 360 min of observation |
| 8(C) | 100 parts IXAN ®PV917 PVDC | 0.05 part PTFE DYNEON ™ MMM5935EF fluoropolymer | 0.3 part SOCAL ®312 $CaCO_3$ | 19 | 5+ | nmp | nmp | Preferential flow and pumping problem-test stopped after 60 min |
| 9(C) | 100 parts IXAN ®PV917 PVDC | 0.05 part PLASTISTRENGTH ™ L1000 polymer | 0.3 part SOCAL ®312 $CaCO_3$ | 19 | 1 | 4.4 | 1.6 | Deposit after 240 min |
| 10 | 100 parts IXAN ®PV917 PVDC | 0.1 part TECNOFLON ®NM fluoropolymer | 0.3 part SOCAL ®312 $CaCO_3$ | 21 | 2 | 3.9 | 2.0 | no die deposit after 360 min of observation |
| 11 | 100 parts IXAN ®PV891 PVDC | 0.05 part TECNOFLON ®NM fluoropolymer | 0.3 part SOCAL ®312 $CaCO_3$ | 24 | 1 | 5.9 | 2.1 | no die deposit after 360 min of observation |
| 12(C) | 100 parts IXAN ®PV700 PVDC | 0.05 part TECNOFLON ®NM fluoropolymer | 0.3 part SOCAL ®312 $CaCO_3$ | 9 | 2 | 12.4 | 2.4 | Deposit after 60 min and detachment |
| 13(C) | 100 parts IXAN ®PV700 PVDC | 0.1 part TECNOFLON ®NM fluoropolymer | / | <6 | 1 | 8.7 | 2.9 | Deposit after 60 min and detachment |

Each of the compositions comprises 1.6 parts of epoxidized soybean oil.
nmp: not possible to measure

The invention claimed is:

1. A vinylidene chloride copolymer composition comprising:
(A) at least one vinylidene chloride copolymer which is a copolymer composed of vinylidene chloride in an amount of at least 50 wt % and of at least one comonomer at least one of which is chosen from (meth)acrylic monomers corresponding to the general formula:

$$CH_2=CR_1R_2$$

in which R1 is chosen from hydrogen and the methyl radical and $R_2$ is the —CO—$R_3$ radical in which $R_3$ is the —O—$R_4$ radical with $R_4$ chosen from the linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms;
(B) from 0.5 to 4 parts by weight, per 100 parts by weight of (A), of epoxidized soybean oil;
(C) from 0.01 to 2 parts by weight, per 100 parts by weight of (A), of at least one fluoroelastomer; and
(D) from 0.05-1 part by weight, per 100 parts by weight of (A), of at least one acid scavenger,
wherein said at least one fluoroelastomer (C) meets at least one of the following criteria:
said at least one fluoroelastomer has a $T_g$ below 0° C.;
said at least one fluoroelastomer has a heat of fusion of less than 1 J/g; and
said at least one fluoroelastomer comprises more than 90 wt % of repeat units derived from one or more fluoromonomers.

2. The copolymer composition according to claim 1, comprising a single vinylidene chloride copolymer.

3. The copolymer composition according to claim 1, wherein the vinylidene chloride copolymer is a copolymer comprising vinylidene chloride in an amount of at least 50 wt % and methyl acrylate.

4. The copolymer composition according to claim 1, comprising from 1 to 2 parts by weight, per 100 parts by weight of (A), of epoxidized soybean oil.

5. The copolymer composition according to claim 1, comprising from 0.01 to 0.1 parts by weight, per 100 parts by weight of (A), of said at least one fluoroelastomer.

6. The copolymer composition according to claim 1, comprising a single fluoroelastomer.

7. The copolymer composition according to claim 1, comprising from 0.1 to 0.5 parts by weight, per 100 parts by weight of (A), of at least one acid scavenger.

8. The copolymer composition according to claim 1, comprising a single acid scavenger.

9. A process for preparing a composition according to claim 1, comprising a mixing of (A), (B), (C) and (D) via premixing.

10. A process for preparing a composition according to claim 1, comprising a mixing of (A) containing at least one part of (B) and/or at least one part of (C), the optional balance of (B), the optional balance of (C), and (D) via premixing.

11. The process for preparing a composition according to claim 10, characterized in that it comprises a mixing of (A) with a mixture of (B), (C) and (D) produced previously.

12. A multilayer film which comprises the copolymer composition according to claim 1.

13. A packaging or bag formed from the multilayer film according to claim 12, suitable for food packaging.

14. The copolymer composition according to claim 1, comprising calcium carbonate.

15. The copolymer composition according to claim 8, comprising calcium carbonate.

16. The copolymer composition according to claim 1, wherein said at least one fluoroelastomer has a $T_g$ below 0° C.

17. The copolymer composition according to claim 1, wherein said at least one fluoroelastomer has a heat of fusion of less than 1 J/g.

18. The copolymer composition according to claim 1, wherein said at least one fluoroelastomer comprises more than 90 wt % of repeat units derived from one or more fluoromonomers.

19. The copolymer composition according to claim 1, wherein a total amount of fluoroelastomers is at most 0.1 part by weight per 100 parts by weight of (A).

20. The copolymer composition according to claim 3, wherein the vinylidene chloride copolymer is a copolymer comprising vinylidene chloride in an amount of at least 50 wt %, methyl acrylate, and at least one comonomer chosen from methyl methacrylate, ethyl acrylate, ethyl methacrylate, n-butyl acrylate, n-butyl methacrylate, 2-ethylhexyl acrylate and 2-ethylhexyl methacrylate, vinyl acetate, maleic anhydride, itaconic acid, acrylonitrile, methacrylonitrile, acrylic acid and methacrylic acid.

* * * * *